United States Patent
Suetsugu et al.

(10) Patent No.: US 8,532,695 B2
(45) Date of Patent: Sep. 10, 2013

(54) MOBILE TELEPHONE, TELEPHONE NUMBER MANAGING SERVER, TELEPHONE NUMBER CHANGING SYSTEM, TELEPHONE NUMBER REQUESTING METHOD, AND TELEPHONE NUMBER REQUESTING PROGRAM

(75) Inventors: Hirokazu Suetsugu, Osaka (JP); Kazuo Fujita, Osaka (JP); Naoki Kaida, Osaka (JP)

(73) Assignee: Kyocera Corporation, Kyoto (JP)

( * ) Notice: Subject to any disclaimer, the term of this patent is extended or adjusted under 35 U.S.C. 154(b) by 724 days.

(21) Appl. No.: 12/294,587

(22) PCT Filed: Mar. 6, 2007

(86) PCT No.: PCT/JP2007/054346
§ 371 (c)(1),
(2), (4) Date: Jun. 17, 2009

(87) PCT Pub. No.: WO2007/111093
PCT Pub. Date: Oct. 4, 2007

(65) Prior Publication Data
US 2009/0305691 A1 Dec. 10, 2009

(30) Foreign Application Priority Data
Mar. 27, 2006 (JP) .................................. 2006-086453

(51) Int. Cl.
*G06F 7/04* (2006.01)
(52) U.S. Cl.
USPC ........................................... 455/550.1; 726/5
(58) Field of Classification Search
USPC ................... 455/550.1, 461, 557, 422.1, 433, 455/411, 518
See application file for complete search history.

(56) References Cited

U.S. PATENT DOCUMENTS

| 6,108,790 A | * | 8/2000 | Moriya et al. | 726/5 |
| 2005/0192035 A1 | * | 9/2005 | Jiang | 455/461 |

FOREIGN PATENT DOCUMENTS

| JP | 2003-244290 | | 8/2003 |
| JP | 2003-258999 | | 9/2003 |
| JP | 2004-312385 | | 11/2004 |
| JP | 2005-117545 | | 4/2005 |
| JP | 2003-429585 | * | 7/2005 |
| JP | 2005-191836 | | 7/2005 |
| WO | WO-2005/018209 | | 2/2005 |

OTHER PUBLICATIONS

International Search Report dated Apr. 10, 2007 directed towards international application No. PCT/JP2007/054346; 3 pages.
Japanese Office Action mailed on Sep. 28, 2010 directed to Japanese Application No. 2008-7025913; (4 pages).
Korean Office Action mailed on Sep. 28, 2010 directed to Korean Application No. 2008-7025913; (8 pages).

* cited by examiner

*Primary Examiner* — Kent Chang
*Assistant Examiner* — Ngan Pham Lu
(74) *Attorney, Agent, or Firm* — Duane Morris LLP

(57) ABSTRACT

It is desired from the viewpoints of accessory and economy to make common use of one telephone number among a plurality of mobile telephones. A server makes an ID intrinsic to a mobile telephone and a telephone number correspond to each other thereby to relay communications between the mobile telephones made to correspond. A mobile telephone requests the server managing the telephone number and the ID of the mobile telephone from itself via the Internet, to change the correspondence between the telephone number and the mobile telephone ID. In response to this request, the server changes the correspondence between the telephone number and the mobile telephone ID.

11 Claims, 7 Drawing Sheets

FIG. 4

| TELEPHONE NUMBER | AUTHENTICATION NUMBER | MOBILE TELEPHONE ID | USER ID |
|---|---|---|---|
| 090-5132-AAAA | 19927800 | A05-398221 | CO0210 |
| 090-6537-BBBB | 80818283 | Z11-439925 | KY0321 |
| 090-2990-CCCC | 12345678 | D53-399022 | KK1215 |
| 090-4144-DDDD | 78667890 | A56-749302 | KK0227 |
| 090-8652-EEEE | 33879201 | D01-478023 | RM0808 |
| 090-3777-FFFF | 41978925 | G95-121140 | RM0808 |
| ... | ... | ... | ... |

MOBILE TELEPHONE, TELEPHONE NUMBER MANAGING SERVER, TELEPHONE NUMBER CHANGING SYSTEM, TELEPHONE NUMBER REQUESTING METHOD, AND TELEPHONE NUMBER REQUESTING PROGRAM

TECHNICAL FIELD

The present invention relates to a mobile telephone and a system including the mobile telephone, in particular, to a technology for enabling a telephone number, which is used by a mobile telephone to call/receive calls, to be used by another mobile telephone as well.

BACKGROUND ART

Currently, a considerable number of users own more than one mobile telephone.

This is because some users use a mobile telephone which only has a call function at office, while using a mobile telephone which has versatile functions such as a camera function in their personal life. In such cases, users need to have two essentially different mobile telephones. Besides, while both mobile telephones are entitled to services for making/receiving calls as each mobile telephone has a telephone number allocated by a telecommunication carrier, it is not economically advantageous since each mobile telephone is charged separately.

Use of a SIM (Subscribe Identity Module) card is one way to avoid being charged for two mobile telephones. A SIM card is recorded with information such as a user's telephone number, email, address book, and mobile telephone ID. By removing the card from a mobile telephone and inserting it to another mobile telephone, the another mobile telephone can be used (such as for making/receiving calls) as one's own mobile telephone. Such a SIM is sometimes called an UIM (User Identify Module).

However, it is a cumbersome process for a user to remove and insert a SIM card.

Accordingly, Patent Document 1 discloses a card case which, in order to omit a process of removing/inserting a SIM card from/to a mobile telephone, holds a SIM card and transmits the mobile telephone ID registered on the SIM card to one of the mobile telephones of the user.

Patent Document 1: Japanese Laid-Open Patent Application Publication No. 2003-244290

DISCLOSURE OF THE INVENTION

Problems the Invention is Going to Solve

However, if the user takes a mobile telephone which has no SIM card inserted therein, by mistake, the mobile telephone is unable to execute functions for making/receiving calls, causing the user considerable inconvenience.

On the other hand, adopting the technique of Patent Document 1 requires purchasing the card case in addition to the mobile telephone, which places a financial burden on the user. Additionally, it increases the number of items to be taken along, as the user needs to carry the card case in addition to the mobile telephone. In a case where the user forgets to take the card case, naturally, the telephone number cannot be transferred to another mobile telephone.

The present invention was conceived in view of the above problems, and aims to provide a mobile telephone, a plurality of which can commonly use one telephone number, and a system thereof.

Means of Solving the Problems

In order to solve the stated problem, the present invention provides a mobile telephone comprising a network communication unit operable to communicate with a telephone number management server via a network, the telephone number management server relaying calls between mobile telephones with use of information indicating one-to-one correspondences between a plurality of telephone numbers and a plurality of pieces of identification information respectively unique to the mobile telephones, and a request unit operable to, via the network communication unit, (i) notify the telephone number management server of identification information of the mobile telephone and (ii) request the telephone number management server to establish a correspondence between (a) a predetermined telephone number that is pre-registered in the telephone number management server and (b) the notified identification information.

Here, the identification information can be any information which enables base stations and telephone exchange offices to identify each mobile telephone. One example is an ID (IDentifier) number which is unique to a mobile telephone.

The predetermined number is a telephone number registered in the telephone number management server, and not all the mobile telephones and telephone numbers need to be associated with each other.

Effects of the Invention

According to the stated structure, the mobile telephone can request a telephone number, which is registered in the server, as the telephone number of the mobile telephone itself and receive telephone calls made to the telephone number from other telephones. Consequently, unlike conventional methods, there is no need to remove and insert a SIM card. In addition, a card case such as the one disclosed by Patent Document 1 is not required, relieving the user of a financial burden as a result. Further, since the user subscribes to only one telephone number with the telecommunication carrier, it is more economical than subscribing to multiple telephone numbers each for use on a different mobile telephone.

Additionally, in a case where the user owns multiple mobile telephones, the user can take out and use whichever of the mobile telephones he/she feels like using on that day. This enhances function of a mobile telephone as a fashion accessory.

The mobile telephone may further comprise a storage unit operable to store, as a telephone number of the mobile telephone, a telephone number transmitted from the telephone number management server, and an output unit operable to output the telephone number stored by the storage unit.

Consequently, the mobile telephone can store the telephone number transmitted from the server as the telephone number of its own and displays it on the monitor thereof or notifies it to other mobile telephones via an infrared communication or the like.

The mobile telephone may further comprise a registration unit operable to newly register, to the telephone number management server via the network communication unit, a telephone number which has not been registered in the telephone number management server.

Accordingly, the mobile telephone can register, to the telephone number management server, the telephone number which is desired to be used on itself, and, from then on, the telephone number becomes available for use by another mobile telephone.

The registration unit may further register, along with the telephone number, authentication information used by the telephone number management server to permit use of the telephone number registered therewith, and the request unit also transmits the authentication information to the telephone number management server when requesting the telephone number management server to establish a correspondence between (a) the telephone number that is registered and (b) the identification information unique to the mobile telephone.

According to the stated structure, the user can register an arbitrary authentication number, which allows only the user to use the telephone number. The telephone number management server judges, based on the authentication number set by the user, whether or not use rights of the telephone number can be acquired. Consequently, the user can set an authentication number which is easy for him/her to remember, and is relieved of fear that other users may use the telephone number without permission. While, in general, changing the telephone number without permission causes the user a considerable inconvenience, transmission of authentication information can improve the security regarding changing the telephone number.

The mobile telephone may further comprise an acquisition unit operable to (i) transmit the telephone number of the mobile telephone to another mobile telephone with use of a short-range wireless communication and (ii) acquire identification information of the another mobile telephone, and a change request unit operable to request the telephone number management server to change a correspondence, by transmitting the identification information of the another mobile telephone to the telephone number management server, such that the telephone number corresponding to the identification information of the mobile telephone corresponds to the identification information of the another mobile telephone.

According to the stated structure, the mobile telephone becomes able to request the telephone number management server to change the correspondence so that the telephone number used by the mobile telephone itself is registered as the telephone number of another telephone. Consequently, even in a case where the mobile telephone for which it is desired to acquire the telephone number cannot access the network, another mobile telephone number can request the telephone number management server to change the correspondence with respect to the telephone number.

The present invention also provides a telephone number management server which relays calls between mobile telephones with use of information indicating one-to-one correspondences between a plurality of telephone numbers and a plurality of pieces of identification information respectively unique to the mobile telephones. The telephone number management server comprises a storage unit operable to store the plurality of telephone numbers and the plurality of pieces of identification information in a one-to-one correspondence, a receiving unit operable to receive, from a mobile telephone, a request to establish a correspondence between a telephone number and identification information of a mobile telephone specified by the mobile telephone which has transmitted the request, and a correspondence unit operable to change a correspondence between the telephone number, which is specified based on the received request, and a corresponding piece of identification information such that the telephone number corresponds to the identification information of the specified mobile telephone.

According to the stated structure, the telephone number management server can change, based on the request from the mobile telephone, the correspondence between the telephone number and the identification information of the mobile telephone to the correspondence between the telephone number and the identification information transmitted from the mobile telephone. Consequently, upon the change of the correspondence, call requests made to the telephone number can be received by the mobile telephone having the identification corresponding to the telephone number.

The storage unit may store the telephone numbers and/or the plurality of pieces of identification information in a one-to-one correspondence with a plurality of pieces of first authentication information each used to permit a change of a piece of identification information corresponding to one of the telephone numbers, the receiving unit receives, along with the request, second authentication information, the telephone number management server further comprises an authentication unit operable to judge whether or not the second authentication information matches a piece of first authentication information corresponding to the telephone number specified by the received request, and the correspondence unit, if the authentication unit determines that the second authentication information matches the first authentication information, changes the correspondence.

According to the stated structure, the telephone number management server can judge whether or not to permit the change of the correspondence between the telephone number and the mobile telephone based on the authentication information transmitted from the mobile telephone. Consequently, it gives the user a sense of security that only the user, who knows the authentication information, can use the telephone number and no other users can use it.

The telephone management server of may further comprise a notification unit operable to, if the correspondence unit changes the correspondence, notify the mobile telephone, whose identification information corresponds to the telephone number, of the corresponding telephone number.

According to the stated structure, the telephone number management server can notify the mobile telephone which telephone number corresponds to the mobile telephone, and the user of the mobile telephone can confirm the telephone number thereof. Consequently, the user can, for example, tell the telephone number of the mobile telephone to his/her friends.

In addition, the present invention also provides a telephone number changing system comprising a plurality of mobile telephones and a telephone number management server which relays calls between mobile telephones with use of information indicating one-to-one correspondences between a plurality of telephone numbers and a plurality of pieces of identification information respectively unique the mobile telephones. Here, the telephone number management server comprises a storage unit operable to store the plurality of telephone numbers and the plurality of pieces of identification information of in a one-to-one correspondence, a receiving unit operable to receive, from a mobile telephone, a request to establish a correspondence between a telephone number and identification information of a mobile telephone specified by the mobile telephone which has transmitted the request, and a correspondence unit operable to change a correspondence between the telephone number, which is specified based on the received request, and a corresponding piece of identification information such that the telephone number corresponds to the identification information of the specified mobile telephone. Also, each of the plurality of mobile telephones comprises a network communication unit operable to communicate, via a network, with the telephone number management server and a request unit operable to, via the network communication unit, (i) notify the telephone number management server of identification information of the mobile telephone notifying and (ii) request the telephone number management server to establish a correspondence between (a) a predetermined telephone number that is pre-registered in the telephone number management server and (b) the notified identification information.

Through transmission and reception of data between the mobile telephone and telephone number management server, the telephone number management server can assign a telephone number to the mobile telephone by establishing a correspondence between the telephone number and the identification information of the mobile telephone.

The present invention also provides a telephone number request method used by a mobile telephone to request a telephone number management server to establish a one-to-one correspondence between a telephone number and a piece of identification information, the telephone number management server relaying calls between mobile telephones with use of information indicating one-to-one correspondences between a plurality of telephone numbers and a plurality of pieces of identification information respectively unique to the mobile telephones. Here, the telephone number request method comprises a requesting step of requesting, via a network, the telephone number management server to establish a correspondence between a predetermined telephone number and apiece of identification information of the mobile telephone transmitted by the mobile telephone and a transmitting step of transmitting authentication information which is used as a basis for the telephone number management server to judge whether or not to change the correspondence.

By executing the above-described method, the mobile telephone can request the telephone number management server to change the correspondence between the telephone number and the identification information of the mobile telephone. If this request for the change is permitted by the telephone number management server, the mobile telephone itself can receive calls made to the telephone number.

Furthermore, the present invention also provides a telephone number request program indicating processes for causing a computer of a mobile telephone to request a telephone number management server to establish a one-to-one correspondence between a telephone number and a piece of identification information, the telephone number management server relaying calls between mobile telephones with use of information indicating one-to-one correspondences between a plurality of telephone numbers and a plurality of pieces of identification information respectively unique to the mobile telephones. Here, the telephone number request program comprises a requesting step of requesting, via a network, the telephone number management server to establish a correspondence between a predetermined telephone number and a piece of identification information of the mobile telephone transmitted by the mobile telephone and a transmitting step of transmitting authentication information which is used as a basis for the telephone number management server to judge whether or not to change the correspondence.

As the computer of the mobile telephone executes the above-described program, the mobile telephone can request the telephone number management server to change the correspondence between the telephone number and the identification information of the mobile telephone. If this request for the change is permitted by the telephone number management server, the mobile telephone itself can receive calls made to the telephone number.

BRIEF DESCRIPTION OF THE DRAWINGS

FIG. 4 shows an example of telephone number data held by the telephone number management server 110;

DESCRIPTION OF REFERENCE NUMERALS

Figure 1:
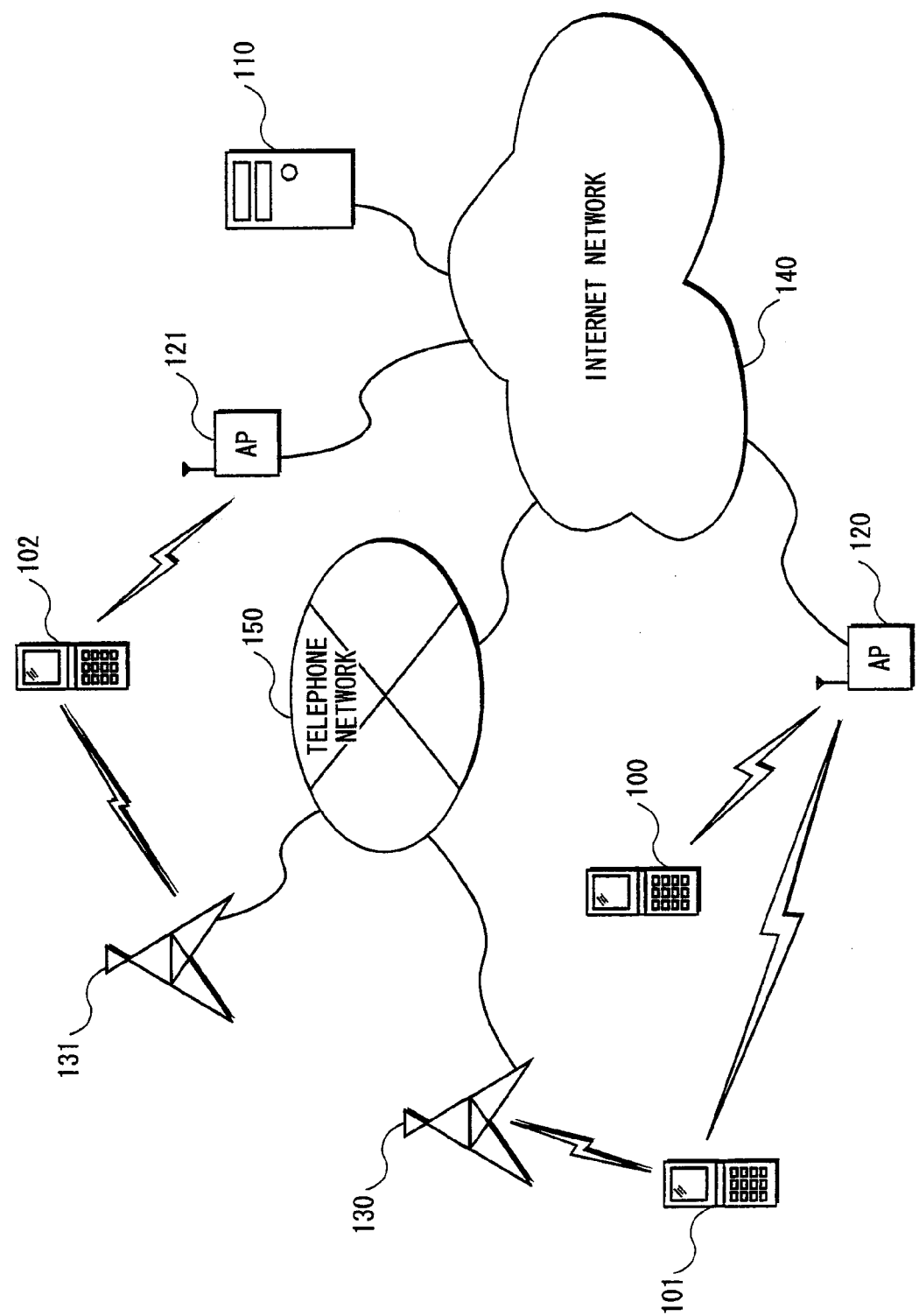
FIG. 1 is a system diagram showing a usage application of a telephone number changing system.

100-102 . . . mobile telephone
110 . . . telephone number management server
120, 121 . . . access point
130, 131 . . . base station
140 . . . internet network
150 . . . telephone network
210 . . . network communication unit
211 . . . antenna
220 . . . call communication unit
221 . . . antenna
230 . . . audio processing unit
231 . . . microphone
232 . . . speaker
240 . . . operation unit
250 . . . display unit
260 . . . storage unit
270 . . . control unit
310 . . . communication unit
320 . . . control unit
321 . . . authentication unit
330 . . . storage unit
331 . . . telephone number management table

BEST MODE FOR CARRYING OUT THE INVENTION

In the following, a telephone number changing system of the present invention will be described with reference to the drawings.

FIG. 1 shows a usage application of the present system.

As FIG. 1 shows, the telephone number changing system includes mobile telephones 100 to 102, a telephone number management server 110, access points (APs) 120 and 121, base stations 130 and 131, an internet network 140, and a telephone network 150. In FIG. 1, for example, a symbol between the mobile telephone 101 and the base station 130 represents electricity and indicates that the mobile telephone 101 and the base station 130 are able to communicate with each other wirelessly.

The mobile telephones 100 to 102 are able to communicate with the base stations and the access points wirelessly. Also, the APs 120 and 121 and the telephone number management server 110 are connected to the internet network 140, and the base stations 130 and 131 are connected to the telephone network 150.

In FIG. 1, the mobile telephone 100, while being able to connect to the internet network 140, is unable to make/receive a call because the correspondence is not established, at the telephone exchange office, between the ID unique to the mobile telephone 100 and a telephone number, the ID being information used to identify a mobile telephone.

On the other hand, the mobile telephones 101 and 102 can connect to any of the internet network 140 and the telephone network 150. Here, it is assumed that the mobile telephone 100 and the mobile telephone 101 are owned by one user.

The mobile telephones 100 to 102 have functions equivalent to those of regular mobile telephones. As a specific example, a functional structure of the mobile telephone 100 is shown in FIG. 2.

Figure 2:
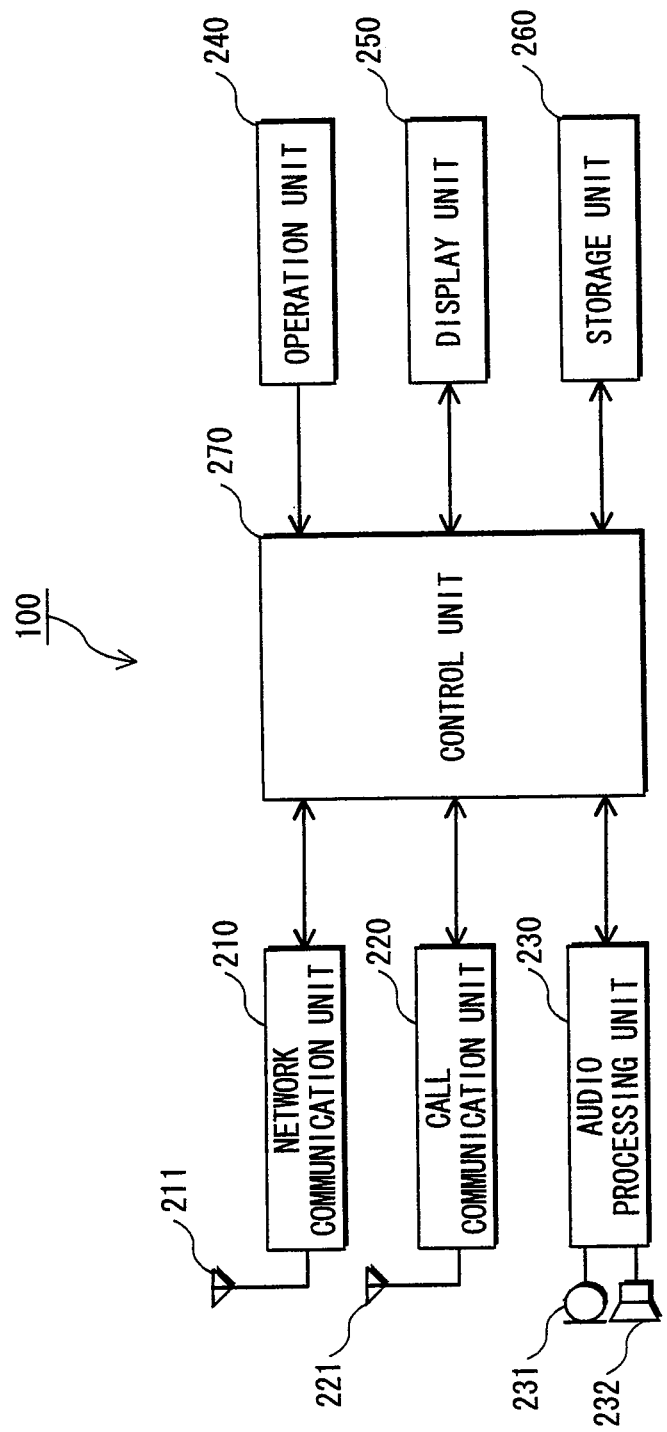
FIG. 2 is a block diagram showing a functional structure of a mobile telephone 100.

As shown in FIG. 2, the mobile telephone 100 includes a network communication unit 210, a call communication unit 220, an audio processing unit 230, an operation unit 240, a display unit 250, a storage unit 260, and a control unit 270.

The above-mentioned network communication unit is realized by the network communication unit 210, while the request unit is realized by the control unit 270. Likewise, the storage unit is realized by the storage unit 260; the output unit is realized by a combination of the control unit 270 with the network communication unit 210 or with the display unit 250; and the registration unit is realized by a combination of the network communication unit 210 and the control unit 270.

The network communication unit 210 which includes an antenna 211 connects to an internet network and performs communication via the antenna 211. In addition, the network communication unit 210 also (a) transmits email data that is output from the control unit 270 and (b) receives transmitted data via the antenna 211 and outputs the received transmitted data to the control unit 270. Further, the network communication unit 210 acquires web page data and outputs it to the control unit 270.

The call communication unit 220 which includes an antenna 221 demodulates signals received from the antenna 221 into reception audio signals and outputs the demodulated reception audio signals to the audio processing unit 230 via the control unit 270. Also, the call communication unit 220 modulates transmission audio signals A/D converted by the audio processing unit 230 and outputs the modulated transmission audio signals from the antenna 211.

The audio processing unit 230 D/A converts the reception audio signals outputted from the call communication unit 220 and out puts the converted signals to a speaker 232. In addition, the audio processing unit 230 A/D converts transmission audio signals obtained by a microphone 231 and outputs the converted signals to the call communication unit 220.

The operation unit 240 which includes a numeric keypad, an on-hook key, an off-hook key, a direction key, a selection key, and the like receives operations by a user and outputs content of the received operations to the control unit 270.

The display unit 250 includes a monitor, namely an LCD (Liquid Crystal Display) or the like, and displays images under instructions from the control unit 270. More specifically, the display unit 250 displays such as a standby screen, contents of an email and the time.

The storage unit 260 includes a ROM (Read Only Memory) and a RAM (Random Access Memory), and is realized by a small hard disk, a nonvolatile memory and the like. The storage unit 260 stores various programs and data required for operations of the mobile telephone 100. Additionally, as a feature of the present invention, the storage unit 260 stores the telephone number, which is callable, of the mobile telephone 100 itself.

The control unit 270 controls each unit of the mobile telephone 100. In particular, the control unit 270 according to the present invention, can request that a desired telephone number and the ID of the mobile telephone 100 itself be made to correspond to each other at the telephone number management server 110. This is in order to allow the mobile telephone 100 to be able, by controlling each unit of the mobile telephone 100, to accept a call request made to the desired telephone number by accessing the telephone number management server 110 based on a user input from the operation unit 230.

Described next is the telephone number management server 110. The telephone number management server 110 stores connectable telephone numbers and manages which telephone number can currently be used by each mobile telephone. In addition, if the telephone number management server 110 changes a registration of the telephone number and the mobile telephone, the telephone number management server 110 transmits information regarding the change to the telephone exchange.

Details of the telephone number management server 110 will be described with reference to a functional block diagram in FIG. 3.

Figure 3:
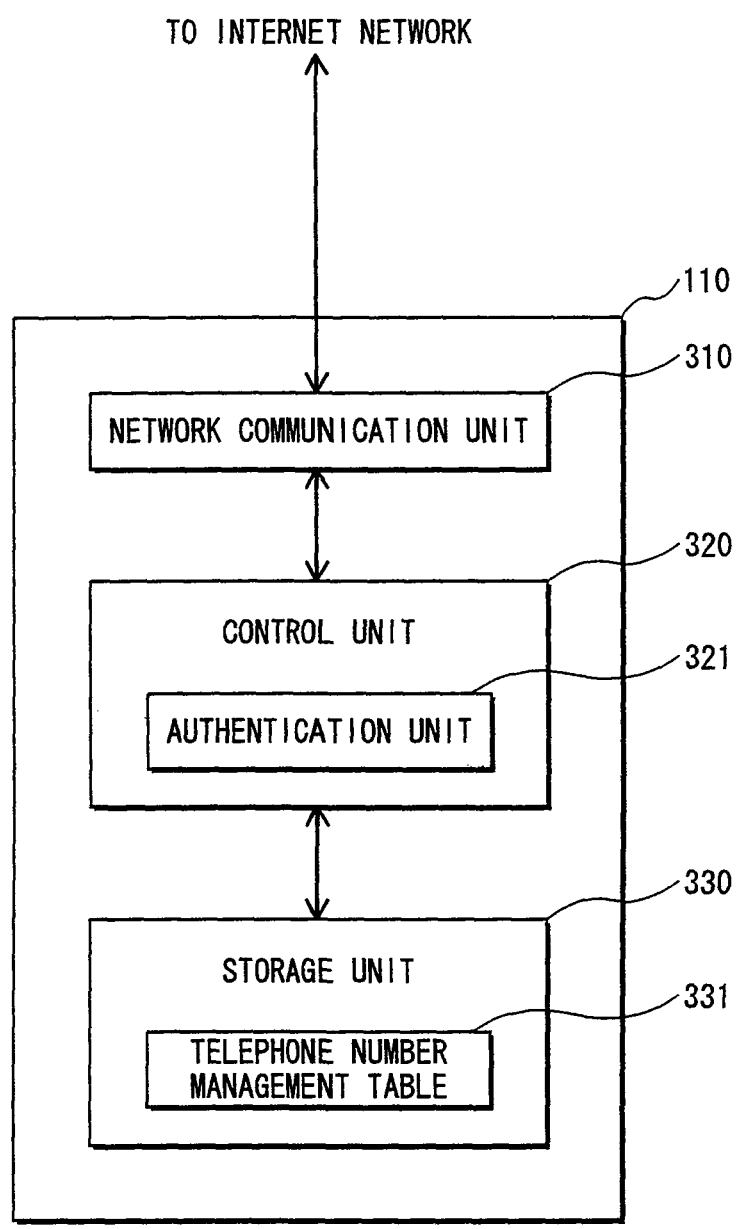
FIG. 3 is a block diagram showing a functional structure of a telephone number management server 110.

As shown in FIG. 3, the telephone number management server 110 includes a network communication unit 310, a control unit 320, and a storage unit 330. In the above-mentioned telephone number management server 110, the storage unit is realized by the storage unit 330, the receiving unit is realized by the network communication unit 310, and the correspondence unit is realized by the control unit 320.

The network communication unit 310 is connected to the internet network 140 and transmits/receives data to/from other devices connected to the internet network 140.

The control unit 320 which includes an authentication unit 321 controls each unit of the telephone number management server 110 and manages telephone numbers of mobile telephones. According to the present invention, particularly, based on a request from a mobile telephone, the authentication unit 321 judges whether or not the telephone number can be allocated to the mobile telephone, and if the authentication unit 321 judges in the affirmative, the control unit 320 establishes a correspondence between a mobile telephone ID on a telephone number management table 331 and the telephone number, and transmits the telephone number to the mobile telephone.

The storage unit 330 includes a recording medium such as a hard disk device and stores various programs and data required for operations of the telephone number management server 110. As a feature of the present invention, the storage unit 330 stores the telephone number management table 331 in which changeable telephone numbers are associated with IDs of the mobile telephones using these changeable telephone numbers, respectively. Details of the telephone number management table 331 will be described later.

Additionally, the telephone number management server 110 is a telephone number management server which relays calls between mobile telephones by establishing one-to-one correspondences between telephone numbers and IDs (identification information) each unique to one of the mobile telephones. The telephone number management server 110 includes the storage unit (storage unit) 330, the network communication unit (receiving unit) 310, and the control unit (correspondence unit) 320. The storage unit 330 stores the telephone numbers and the IDs of the mobile telephones in one-to-one correspondence; the network communication unit 310 receives, from a mobile telephone having a mobile telephone ID which does not correspond with a telephone number in the storage unit 330, a request to establish a correspondence between the ID of the mobile telephone and a predetermined telephone number stored in the storage unit 330; and the control unit 320 performs a control such that in the storage unit 330, the predetermined telephone number is stored in correspondence with the ID of the mobile telephone whose request has been received by the network communication unit 310.

<Data>

Next, data required for the present system will be described.

The required data is managed by the telephone number management server 110. An example of the data is shown in the telephone number management table 331 in FIG. 4. The telephone number management table 331 is updated with an authentication number, a user ID and the like by the telephone number management server 110 when the telephone number management server 110 receives a registration request for a telephone number, from a mobile telephone. Additionally, when the telephone number management server 110 receives, from a mobile telephone, a request to change the correspondence between a telephone number and the ID of the mobile telephone, if the authentication ID is correct, the telephone number management server 110 changes the correspondence.

The telephone number management table 331 includes a telephone number field 401, an authentication number field 402, a mobile telephone ID field 403, and a user ID field 404.

The telephone number field 401 stores a telephone number, registered by the user, which can be shared by a plurality of mobile telephones.

The authentication number field 402 stores a password in correspondence with a telephone number in the telephone number field 401. The password provides a basis for judging whether or not the telephone number management server 110 can allow the correspondence to be rewritten when a user uses the registered telephone number. The user is able to use the telephone number by inputting the corresponding password when requesting the telephone number. Additionally, use of the authentication number can prevent the correspondence between the telephone number and the mobile telephone ID from being changed by a third party.

A new entry is made in the telephone number field 401 by the control unit 320 when a mobile telephone requests a registration of a telephone number. Along with the telephone number, an authentication number is entered in the authentication number field 402 in correspondence with the telephone number by the control unit 320.

The mobile telephone ID field 403 stores the ID of the mobile telephone which corresponds to the telephone number and can receive calls made to the telephone number. In other words, only the mobile telephone whose ID is registered in the mobile telephone ID field 403 is allowed to make/receive calls using this telephone number. The information indicated in the mobile telephone ID field 403 is used for, with use of the ID, differentiating between the mobile telephone allowed to make/receive calls and mobile telephones not allowed to do so. The mobile telephone ID is updated, by the control unit 320, with the ID of the mobile telephone requesting the telephone number if the requested telephone number is permitted to be used by the authentication unit 321.

The user ID field 404 stores information for identifying the user using the telephone number.

As shown in FIG. 4, for example, authentication information "199278000" corresponds to the telephone number "090-5132-AAAA", the ID of a mobile telephone which uses the telephone number "090-5132-AAAA" is "A05-398221", and the user ID is "C00210".

By storing the telephone number management table 331, the telephone number management server 110 can set, to the telephone exchange, the correspondence between the mobile telephone ID and the telephone number. Also, the authentication number can be used to judge whether or not to accept a request for a telephone number from a mobile telephone.

<Operations>

Figure 5:
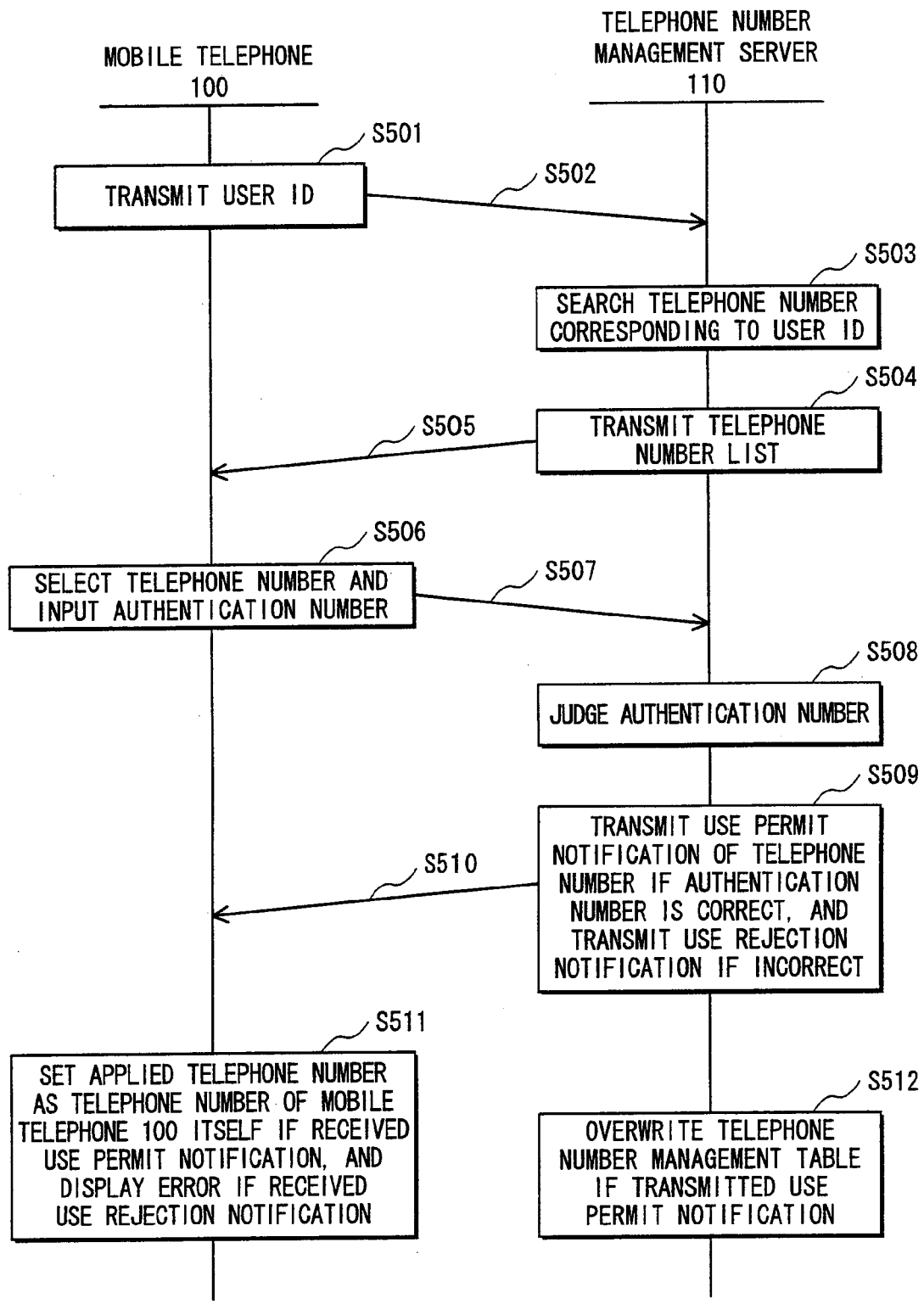
FIG. 5 is a flowchart showing registration processing of a telephone number to the server performed by the mobile telephone.

Lastly, data flow between the mobile telephone and the telephone number management server in the present embodiment where the mobile telephone requests a telephone number will be described with reference to a timing chart shown in FIG. 5. It should be noted that it is assumed here that in the telephone number management table 331, the requested telephone number and the user ID and the authentication number which correspond to the requested telephone number have been already registered. Registration processing will be described later with reference to FIG. 6.

First, upon receiving a user input requesting a telephone number via the operation unit 240, the control unit 270 of the mobile telephone 100 transmits a user ID to the telephone number management server 110 via the network communication unit 210 (steps S501 and S502). The user ID to be transmitted may be input by the user, or may be pre-registered in the storage unit 260 of the mobile telephone 100.

Upon receiving the user ID, the control unit 320 of the telephone number management server 110 searches, in the telephone number management table 331, a telephone number corresponding to the user ID (step S503). The control unit 320 then transmits, to the mobile telephone 100, the telephone number which has been obtained through the search. If more than one telephone number has been obtained through the search, the control unit 320 prepares a list of these telephone numbers and transmits it (steps S504 and S505). For example, If the user ID of the mobile telephone 100 is "RM0808", telephone numbers "090-8652-EEEE" and "090-37777-FFFF" are transmitted (see FIG. 4).

Upon receiving the telephone number transmitted from the telephone number management server 110, the control unit 270 of the mobile telephone 100 makes the display unit 250 display the received telephone number. Upon viewing the telephone number on the display unit 250, the user selects one telephone number if there is more than one, and inputs the authentication number to use the telephone number (step S506). Upon receiving the selection of the telephone number and the input of the authentication number via the operation unit 240, the control unit 270 of the mobile phone 100 transmits the selected telephone number and the authentication number to the telephone number management server 110 (step S507).

Having received the telephone number and the authentication number, the authentication unit 321 of the telephone number management server 110 judges whether or not the authentication number stored, in the telephone number management table 331, in correspondence with the received telephone number and the received authentication number correspond with each other (step S508).

If the authentication unit 321 judges that the authentication numbers do not correspond with each other, the authentication unit 321 transmits to the mobile telephone 100 a use rejection notification which indicates that the authentication numbers do not correspond with each other and the received telephone number is unusable. If the authentication unit 321 judges that the authentication number is correct, that is, the authentication numbers correspond with each other, the authentication unit 321 transmits a use permit notification of the telephone number to the mobile telephone 100(steps S509 and S510).

If the use permit notification is transmitted, the control unit 320 updates the mobile telephone ID which corresponds to the telephone number, use of which has been permitted, with the mobile telephone ID of the mobile telephone 100 (step S512) which has received the use permit notification. For example, if the mobile telephone ID of the mobile telephone 100 is "G22-390834" and the telephone number to be used is "090-3777-FFFF", the mobile telephone ID "G95-121140" will be changed to "G22-390834".

Meanwhile, if the use permit notification is received, the mobile telephone 100 stores, as its own telephone number, the telephone number selected by the user, in the storage unit 260. A telephone number which has been used and stored therein is updated by the telephone number selected by the user. On the other hand, if the use rejection notification is received, the control unit 270 makes the display unit 250 display an error message such as "The identification number is incorrect" (step S511).

Thus, if the telephone number management server 110 allows the correspondence to be changed, the mobile telephone 100 becomes able to receive calls made to the telephone number which the mobile telephone 100 itself requested.

Described above is the flow of processing performed by the mobile telephone 100 from requesting the telephone number to becoming able to use the telephone number.

Figure 6:
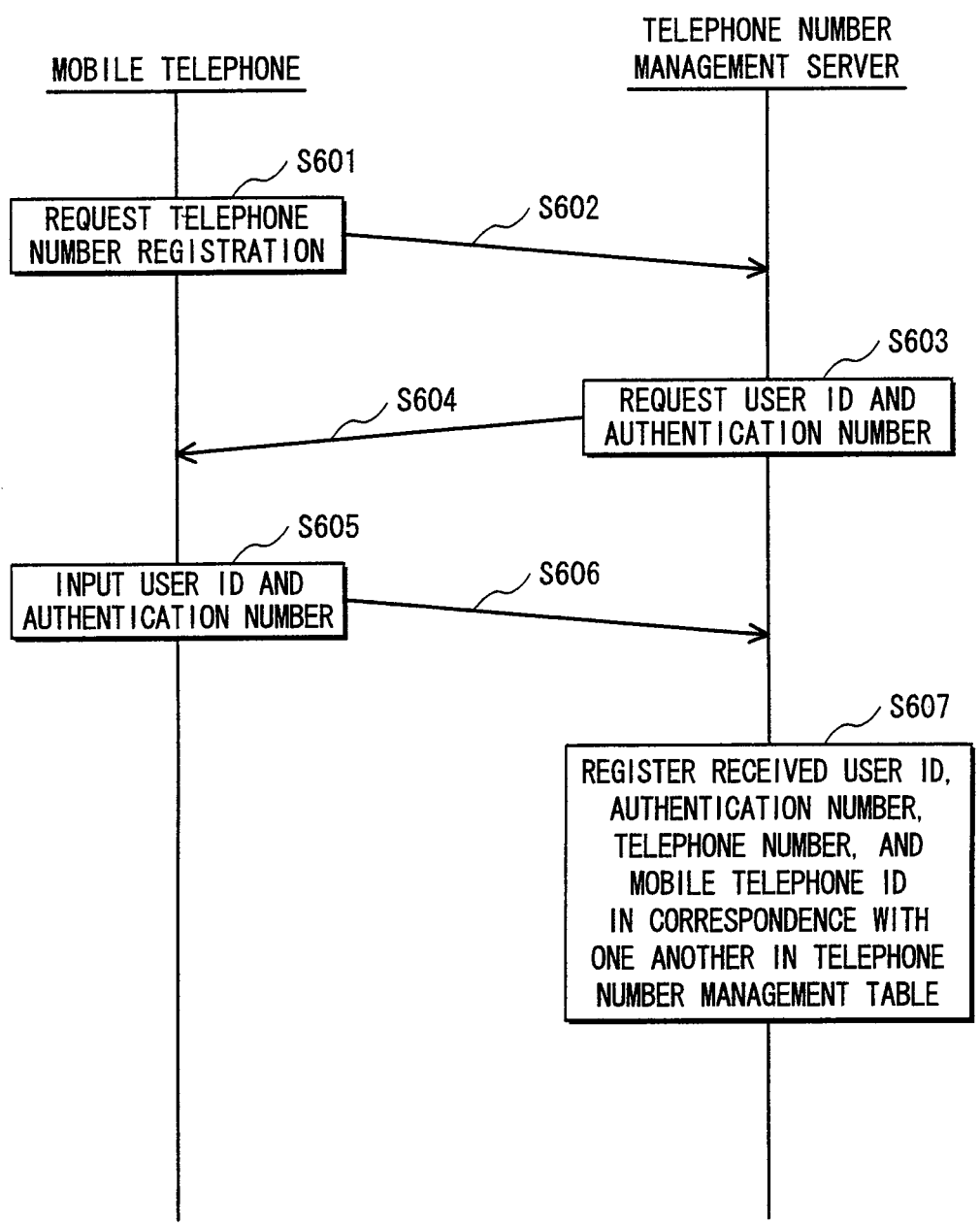
FIG. 6 is a timing chart showing processing by the mobile telephone from requesting the server for a telephone number to setting the telephone number therein.

The timing chart in FIG. 6 shows a flow of processing in which the mobile telephone 100 registers the telephone number to the telephone number management server 110.

When the mobile telephone 100 requests the correspondence with respect to the telephone number to be changed, as in the above-described case, the telephone number to be used needs to be pre-registered in the server. The following describes the flow of the pre-registration.

Here, for descriptive purposes, the processing will be described under the assumption that the user of the mobile telephone 100 registers the telephone number of the mobile telephone 100 itself.

As shown in FIG. 6, first, the operation unit 240 of the mobile telephone 100 receives input of a registration request from the user (step S601). Upon receiving the registration request, the control unit 270 of the mobile telephone 100 requests the telephone number management server 110 to register the telephone number (step S602). When requesting, the control unit 270 transmits the telephone number, which is to be registered, as well.

Upon receiving the registration request of the telephone number, the telephone number management server 110 requests a user ID and an authentication number from the mobile telephone 100, the user ID being used for identifying the user who can use the telephone number (steps S603 and S604).

Having received the request, the mobile telephone 100 notifies the user by displaying on the display unit 250 that the user ID and the authentication number are requested. Upon receiving input of the user ID and the authentication number from the user, the mobile telephone 100 transmits the user ID, the authentication number, and the mobile telephone ID of its own to the telephone number management server 110 (steps S605 and S606).

Upon receiving the user ID, the authentication number, and the mobile telephone ID, the telephone number management server 110 registers the received user ID, authentication number, and mobile telephone ID in correspondence with one another (step S607).

Described above is the processing flow up to the registration of the telephone number. Upon completion of this registration processing, the user is ready to make a common use of the telephone number among his/her multiple mobile telephones.

Figure 7:
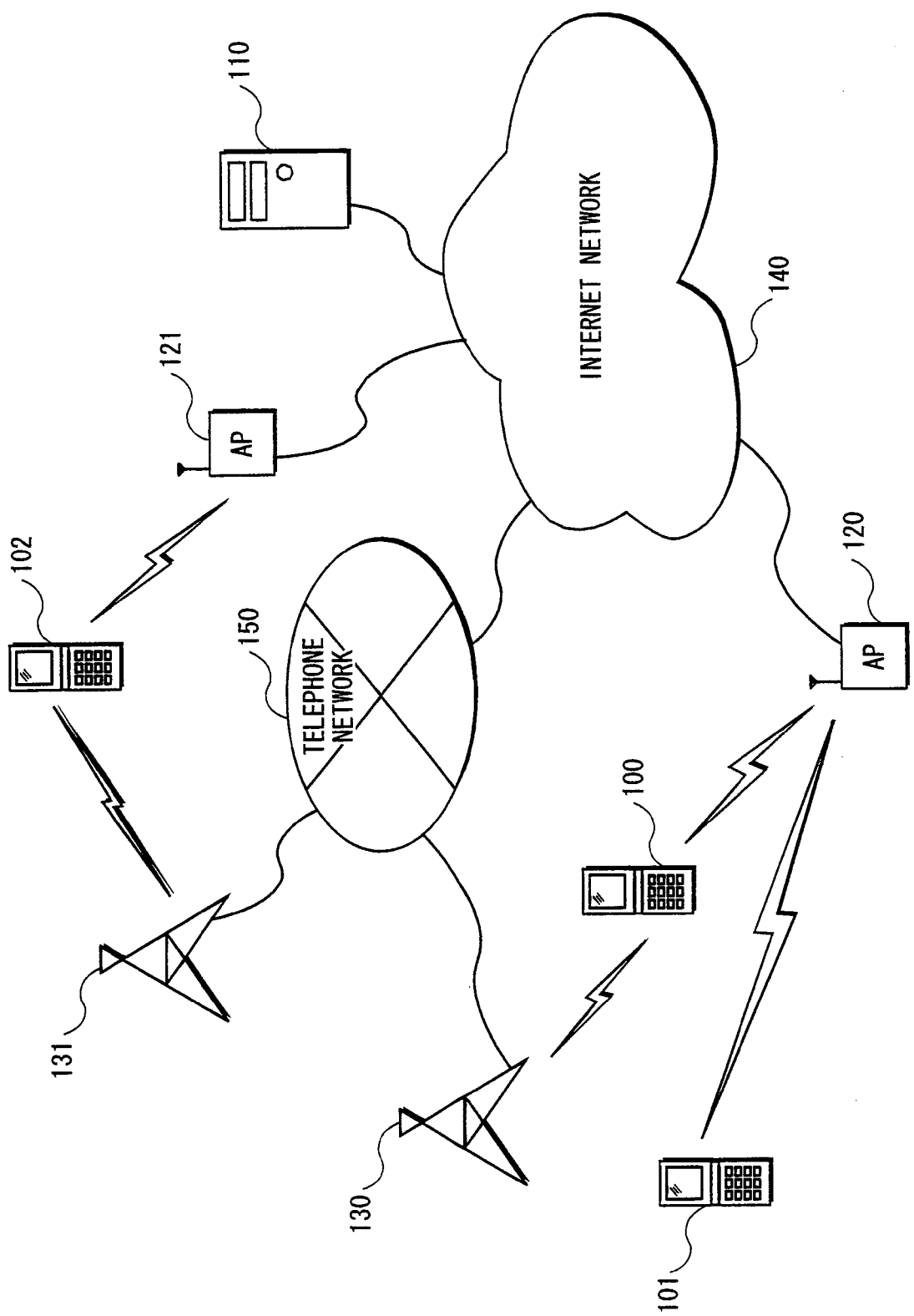
FIG. 7 is a system diagram showing how the system shown in FIG. 1 changes after the mobile telephone 100 requests the telephone number and the corresponding change is made by the telephone number managing server 110.

In the present invention, if the processing shown by the flowchart in FIG. 6 is executed and the telephone number is allowed to be used, for example, the system in FIG. 1 is transformed into a system in FIG. 7.

In FIGS. 1 and 7, a symbol representing radio wave is used where apparatuses can communicate wirelessly with each other. While the mobile telephone 100 is indicated to be unable to make/receive calls in FIG. 1, it is indicated to be able to make/receive calls in FIG. 7. On the other hand, while the mobile telephone 101 is indicated to be able to make/receive calls in FIG. 1, it is indicated to be unable to make/receive calls in FIG. 7. This is because, as described above, the telephone number management server 110 has changed the mobile telephone ID, in the telephone number management table 331, of the telephone number used by the mobile telephone 100 from the ID of the mobile telephone 101 to the ID of the mobile telephone 100.

With this structure, a telephone number can be transferred among mobile telephones without additional effort such as replacing a card.

In addition, since telephone numbers can be changed easily, users can own multiple mobile telephones and use whichever they feel like using on that day. This enhances function of mobile telephones as fashion accessories.

<Supplementary>

While the telephone number changing system, the mobile telephone included in the telephone number changing system, and the telephone number management server which are provided by the present invention have been described by way of the embodiment above, it is to be noted that the present invention is never limited to the embodiment. In the following, modifications of the present invention will be described.

(1) The present invention can be a method which enables a mobile telephone to request a telephone number and enables a setting such that the telephone number becomes usable, as described in the embodiment above. The present invention can also be a computer program which causes a computer to execute processing included in the method.

Such a program may be recorded on various computer-readable recording media such as a hard disk device, a FD (Flexible Disc), an MO (Magneto Optical-Disc), a CD (Compact Disc), a DVD (Digital Versatile Disc), a BD (Blu-ray Disc), and a flash memory.

(2) Each number of mobile telephones, base stations, and APs shown in the system diagram in FIG. 1 of the embodiment is not limited to the number indicated in the figure.

(3) While in the above-described embodiment, the mobile telephone 100 transmits a user ID, it does not have to be a user ID. For example, the following structure can be adopted: the mobile telephone 100 sends the telephone number desired to be used thereon to the telephone number management server; the telephone number management server then (i) requests an authentication number corresponding to the telephone number, and registers the ID of the mobile telephone 100 if the authentication number input by the mobile telephone 100 is correct.

(4) In the above-described embodiment, there is no more description than "data is transmitted" regarding the registration request or the request for a telephone number. However, various transmission methods can be adopted. For example, the data can be transmitted in a form of email after encryption. Or, the telephone number management server may manage a web page and request the telephone number by CGI (Common Gateway Interface) input.

(5) While in the embodiment above, the antennas 211 and 221 are described as different antennas, they can be shared if possible.

(6) In the above-described embodiment, telephone numbers managed by the telephone number management server 110 are pre-registered by users. However, these telephone numbers do not need to be pre-registered by users.

For instance, assume that the telephone number management server 110 holds some telephone numbers which are not in use, and authentication numbers are pre-stored therein to allow these telephone numbers to be used. In this case, when a request for a telephone number is received from a mobile telephone, the telephone number management server 110 notifies the corresponding authentication number to the mobile telephone even if no corresponding user ID is registered, and allows the telephone number corresponding to the authentication number to be used. It should be noted, however, it is necessary to enter a contract with a carrier since using such a telephone number involves a new contract.

(7) In the above-described embodiment, the mobile telephone 100 which has no telephone number requests a telephone number by accessing the telephone number management server 110. However, a mobile telephone which already has a telephone number can request another telephone number and have it allocated.

In this case, whether or not the telephone number previously used is to be rendered unusable depends on judgement of the user or the telecommunication carrier.

(8) In the above-described embodiment, the mobile telephone 100 which has no telephone number requests a telephone number by accessing the telephone number management server 110. However, a structure can be adopted such that a mobile telephone which has a telephone number transfers use rights of the telephone number to a mobile telephone which has no number, with use of a short-range wireless communication.

For example, the following structure can be adopted. The mobile telephone which has a telephone number notifies the telephone number to the mobile telephone which has no telephone number via a short-range communication, and acquires the mobile telephone ID of the mobile telephone which has no telephone number. The mobile telephone which had the telephone number then requests the telephone number management server to transfer the use rights of the telephone number. Upon receiving the request, the telephone number management server 110 rewrites the telephone number management table 331 such that the mobile telephone ID which was transmitted along with the request corresponds with the telephone number. It should be noted here that specific examples of the short-range wireless communication include such as an infrared communication and a communication in accordance with Blue-tooth standards, and the mobile telephones have functions to perform a short-range wireless communication.

In this way, an authentication process can be omitted as the request is made by the mobile telephone which had the telephone number.

(9) In the above-described embodiment, the base stations and APs are described separately to facilitate understating of the present invention. However, the base stations can perform functions of the APs as well.

(10) In the above-described embodiment, the mobile telephone 100 accesses the telephone number management server 110 via an internet network. However, the access can be made via a telephone network or another type of communication network as long as the request to change the correspondence of the telephone number can reach the telephone number management server 110.

(11) In the above-described embodiment, the mobile telephone 100 does not have a telephone number allocated thereon. The mobile telephone 100, however, can have a telephone number already allocated thereon and be able to make/receive calls.

In this case, the mobile telephone 100 requests the telephone number management server 110 to change the correspondence between the telephone number and the mobile telephone ID, and if permitted, the mobile telephone 100 becomes able to receive calls made to multiple telephone numbers.

(12) In the above-described embodiment, IDs each unique to a mobile telephone are used to identify each mobile telephone. However, they do not have to be ID numbers, and can be any information as long as they can identify mobile telephones.

INDUSTRIAL APPLICABILITY

The telephone number changing system of the present invention may be effectively utilized as a system in which one telephone number can be commonly used by multiple mobile telephones.

The invention claimed is:

1. A mobile telephone comprising:
    a network communication unit operable to communicate with a telephone number management server via a network, the telephone number management server relaying calls between mobile telephones with use of information indicating one-to-one correspondences between a plurality of telephone numbers and a plurality of pieces of identification information respectively unique to the mobile telephones;
    a request unit operable to, via the network communication unit, (i) notify the telephone number management server of identification information of the mobile telephone and authentication information specific to a predetermined telephone number that is pre-registered in the telephone number management server, and (ii) request the telephone number management server to establish a correspondence between the predetermined telephone number and the notified identification information; and
    a registration unit operable to newly register, to the telephone number management server via the network communication unit, a telephone number which has not been registered in the telephone number management server.

2. The mobile telephone of claim 1 further comprising:
    a storage unit operable to store, as a telephone number of the mobile telephone, a telephone number transmitted from the telephone number management server; and
    an output unit operable to output the telephone number stored by the storage unit.

3. The mobile telephone of claim 1, wherein
    the registration unit registers, along with the telephone number, authentication information specific to a telephone number, which can be used by the telephone number management server to permit use of the telephone number registered therewith, and
    the request unit transmits the authentication information to the telephone number management server when requesting the telephone number management server to establish a correspondence between (a) the telephone number that is registered and (b) the identification information unique to the mobile telephone.

4. The mobile telephone of claim 1 further comprising
an acquisition unit operable to (i) transmit the telephone number of the mobile telephone to another mobile telephone with use of a short-range wireless communication and (ii) acquire identification information of the another mobile telephone, wherein
the request unit is operable to request the telephone number management server to change a correspondence, by transmitting the identification information of the another mobile telephone to the telephone number management server, such that the telephone number corresponding to the identification information of the mobile telephone corresponds to the identification information of the another mobile telephone.

5. A telephone number management server which relays calls between mobile telephones with use of information indicating, one-to-one correspondences between a plurality of telephone numbers and a plurality of pieces of identification information respectively unique to the mobile telephones, the telephone number management server comprising:
a storage unit operable to store the plurality of telephone numbers and the plurality of pieces of identification information in a one-to-one correspondence as well as a plurality of pieces of first authentication information having a one-to-one correspondence with the plurality of telephone numbers;
a receiving unit operable to receive, from a mobile telephone, (i) a request to establish a correspondence between a telephone number and identification information of a mobile telephone specified by the mobile telephone which has transmitted the request and (ii) second authentication information;
a correspondence unit operable to change a correspondence between the telephone number, which is specified based on the received request, and a corresponding piece of identification information such that the telephone number corresponds to the identification information of the specified mobile telephone, wherein the correspondence unit changes the correspondence if the second authentication information matches the first authentication information corresponding to the telephone number specified by the received request, wherein the mobile telephone registers the telephone number in the number management server if the telephone number has not been previously registered in the telephone number management server.

6. The telephone management server of claim 5, comprising an authentication unit operable to judge whether or not the second authentication information matches a piece of first authentication information corresponding to the telephone number specified by the received request, wherein the correspondence unit, if the authentication unit determines that the second authentication information matches the first authentication information, changes the correspondence.

7. The telephone management server of claim 5 further comprising:
a notification unit operable to, if the correspondence unit changes the correspondence, notify the mobile telephone, whose identification information corresponds to the telephone number, of the corresponding telephone number.

8. A telephone number changing system comprising a plurality of mobile telephones and a telephone number management server which relays calls between mobile telephones with use of information indicating one-to-one correspondences between a plurality of telephone numbers and a plurality of pieces of identification information respectively unique the mobile telephones, wherein
the telephone number management server comprises:
a storage unit operable to store the plurality of telephone numbers and the plurality of pieces of identification information of in a one-to-one correspondence as well as a plurality of pieces of first authentication information having a one-to-one correspondence with the plurality of telephone numbers;
a receiving unit operable to receive, from a mobile telephone, (i) a request to establish a correspondence between a telephone number and identification information of a mobile telephone specified by the mobile telephone which has transmitted the request and (ii) second authentication information; and
a correspondence unit operable to change a correspondence between the telephone number, which is specified based on the received request, and a corresponding piece of identification information such that the telephone number corresponds to the identification information of the specified mobile telephone, wherein the correspondence unit changes the correspondence if the second authentication information matches the first authentication information corresponding to the telephone number specified by the received request, and
each of the plurality of mobile telephones comprises:
a network communication unit operable to communicate, via a network, with the telephone number management server;
a request unit operable to, via the network communication unit, (i) notify the telephone number management server of identification information of the mobile telephone and authentication information specific to a predetermined telephone number that is pre-registered in the telephone number management server, and (ii) request the telephone number management server to establish a correspondence between the predetermined telephone number and the notified identification information; and
a registration unit operable to newly register, to the telephone number management server via the network communication unit, a telephone number which has not been registered in the telephone number management server.

9. A telephone number request method used by a mobile telephone to request a telephone number management server to establish a one-to-one correspondence between a telephone number and a piece of identification information, the telephone number management server relaying calls between mobile telephones with use of information indicating one-to-one correspondences between a plurality of telephone numbers and a plurality of pieces of identification information respectively unique to the mobile telephones, the telephone number request method comprising:
requesting, via a network, the telephone number management server to establish a correspondence between a predetermined telephone number and a piece of identification information of the mobile telephone transmitted by the mobile telephone;
transmitting authentication information specific to the predetermined telephone number which is used as a basis for the telephone number management server to judge whether or not to change the correspondence of the predetermined telephone number; and registering in the telephone number management server the predetermined telephone number if it has not been previously registered in the telephone number management server.

10. A telephone umber request program indicating processes for causing a computer of a mobile telephone to request a telephone number management server to establish a one-to-one correspondence between a telephone number and a piece of identification information, the telephone number management server relaying calls between mobile telephones with use of information indicating one-to-one correspondences between a plurality of telephone numbers and a plurality of pieces of identification information respectively unique to the mobile telephones, the telephone number request program causing the computer to perform a process comprising:

requesting, via a network, the telephone number management server to establish a correspondence between a predetermined telephone number and a piece of identification information of the mobile telephone transmitted by the mobile telephone;

transmitting authentication information specific to the predetermined telephone number which is used as a basis for the telephone number management server to judge whether or not to change the correspondence of the predetermined telephone number; and registering in the telephone number management server the predetermined telephone number if it has not been previously registered in the telephone number management server.

11. A non-transitory computer readable medium storing a program for causing a computer of a mobile telephone to perform a process comprising:

requesting a telephone number management server to establish a one-to-one correspondence between a telephone number and a piece of identification information, the telephone number management server relaying calls between mobile telephones with use of information indicating one-to-one correspondences between a plurality of telephone numbers and a plurality of pieces of identification information respectively unique to the mobile telephones;

requesting, via a network, the telephone number management server to establish a correspondence between a predetermined telephone number and a piece of identification information of the mobile telephone transmitted by the mobile telephone; and transmitting authentication information specific to the predetermined telephone number which is used as a basis for the telephone number management server to judge whether or not to change the correspondence of the predetermined telephone number; and registering in the telephone number management server the predetermined telephone number if it has not been previously registered in the telephone number management server.

* * * * *